Jan. 9, 1951

I. STOKES 2,537,102

RADIO SYSTEM FOR IDENTIFYING FRIENDLY
AIRCRAFT AND THE LIKE

Filed July 26, 1944

INVENTOR.
IRVING STOKES

BY
*William D. Hall.*

ATTORNEY.

*INVENTOR.*
IRVING STOKES
BY William D. Hall
*ATTORNEY.*

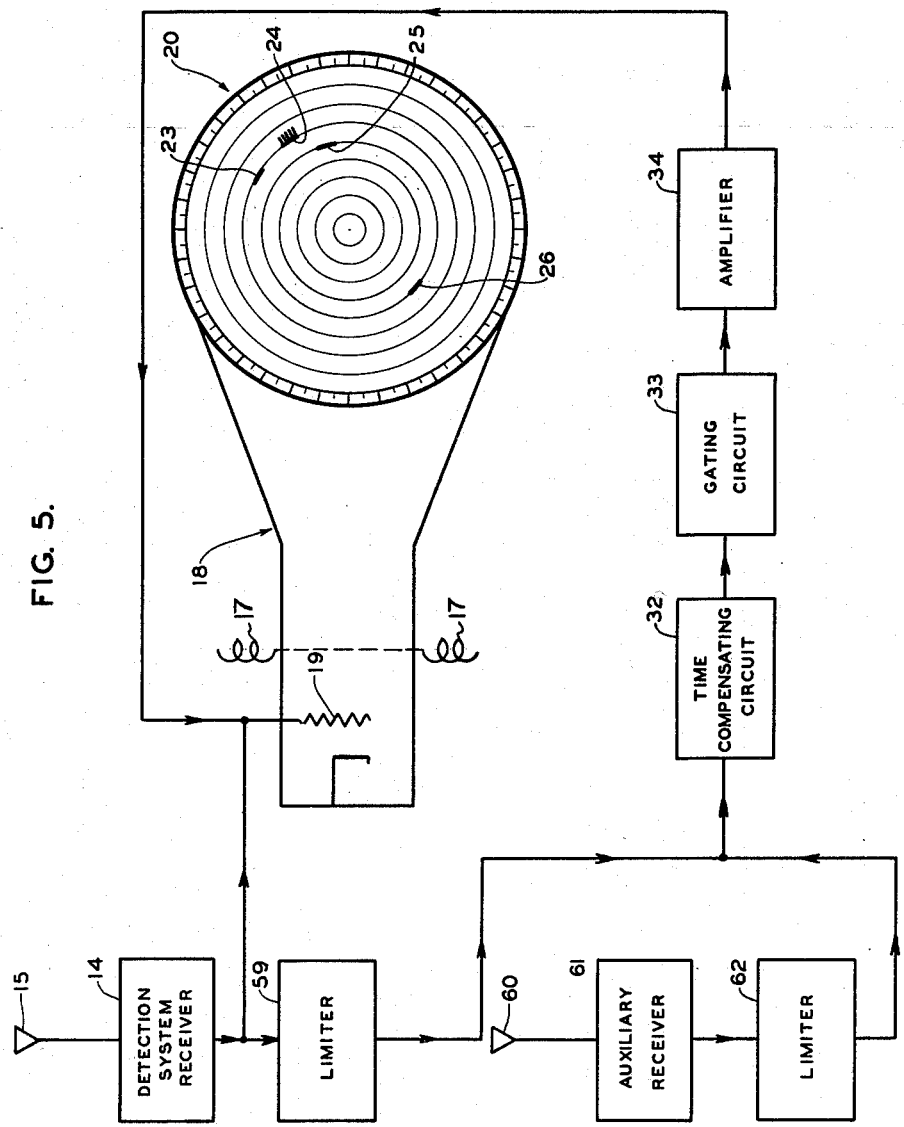

Patented Jan. 9, 1951

2,537,102

UNITED STATES PATENT OFFICE 2,537,102

RADIO SYSTEM FOR IDENTIFYING FRIENDLY AIRCRAFT AND THE LIKE

Irving Stokes, Neptune, N. J.

Application July 26, 1944, Serial No. 546,724

8 Claims. (Cl. 343—6)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to radio systems for object identification, and more particularly, but not exclusively, to improved means for distinguishing between a selected type of aircraft, for example, friendly fighters, and all other craft within the range of a detecting station, thereby enabling more efficient ground control over the interception of enemy raiders than has heretofore been possible.

While not limited thereto, my present invention is especially suitable for use conjointly with a pulse-echo radio system for aircraft detection which incorporates a display of the plan position in space of all craft detected thereby.

It is to be clearly understood that wherever the term "craft" or "aircraft" appears herein, it is intended to include any other objects, such as surface ships, tanks, etc., whether moving or in a fixed position; and, while the purpose of the system to be described is primarily to distinguish between one particular type of friendly craft and all other friendly craft, it is equally applicable as a basic identification system, that is, to distinguish generally between friend and foe.

Before describing my present invention in detail, I deem it advisable to outline the existing system for the ground control of interception which it is my primary purpose to improve. By so doing, one of the failings of such system will become apparent, and the manner in which the present invention overcomes the same will be more readily appreciated.

According to such system, exploratory pulses of radio frequency energy are directionally transmitted into space, and the region about the detecting station is scanned in azimuth by slowly rotating the radiating antenna. Portions of this energy are reflected by any aircraft within the range of the system, and as a result, echo pulses are received back at the site of the original transmission. The azimuthal bearing and the range of each craft causing these echoes are determined by utilizing said echoes to intensity modulate the electron beam of a cathode-ray oscilloscope, said oscilloscope being provided with a radial sweep, synchronized with the transmission of the exploratory pulses, and said sweep being rotated about the central starting point thereof, in synchronism with the above mentioned scanning. The periphery of the oscilloscope screen is calibrated in terms of angular measurement, and the rotating radial sweep is initially adjusted so that it coincides with zero degrees at the instant that the response pattern of the scanning antenna coincides with a predetermined reference direction, for example, north. In addition, the oscilloscope screen is provided with concentric markings calibrated, along some convenient radius, in terms of distance.

The instant an exploratory pulse is transmitted, the oscilloscope sweep commences to move outwardly from the center of the oscilloscope screen, corresponding to the location of the detecting station, along a radius corresponding to the instantaneous azimuthal bearing of the antenna response pattern. Upon encountering a reflecting object in space, such as an aircraft, said pulse is reradiated thereby, and is picked up by said antenna which, because of the high velocity of radio waves as compared with the low rate of rotation of the antenna, is, for all practical purposes, still pointing in the same direction. The pulse is detected in a receiver and then applied to the oscilloscope.

At the instant the oscilloscope sweep arrives at the point along its radial path corresponding to the range of said aircraft, the electron beam of the oscilloscope is intensified for a period corresponding to the pulse width, and a bright spot therefore appears on the sensitive screen of the oscilloscope. This cycle of operations repeats as long as the particular reflecting object remains within a sufficiently intense portion of the rotating antenna pattern to result in echoes capable of detection without altering the receiver sensitivity. This portion of the antenna pattern is generally several degrees in width so that the echo indication on the oscilloscope screen appears as a short arc rather than a spot. The screen is preferably of long persistence so that the echo indications impressed thereon remain visible for a convenient length of time.

As the antenna continues to rotate, additional aircraft are detected, and eventually the oscilloscope screen displays echoes from all craft within the range of the system, and the azimuthal bearing and the range of each such craft are made available to the observers.

It will be noted that examination of such an oscilloscope display does not indicate which of the detected craft are friendly and which are hostile, and in order to obtain this information, additional means are needed. These means neither form any part of the present invention nor is an understanding of the operation thereof necessary to an appreciation of the present invention, and therefore, no description thereof will be given. Suffice it to say, such means enable distinction to be made between friendly and hostile craft.

Of the craft which are determined to be friendly, some may be fighters, some may be bombers, some may be reconnaissance planes, some may be transports, etc. In the efficient operation of a ground control system for the interception of enemy raiders it is essential that those craft which are fighters or interceptors be distinguishable from all others, so that those particular craft can be quickly directed by the ground observers to the enemy planes nearest them, the location of the latter having been determined by such ground observers at the detecting station.

For this purpose, such interceptors are provided with transponders which, when properly conditioned by their pilots in compliance with instructions from the ground, are triggered by the aforementioned exploratory pulses, and intermittently emit recognition pulses for predetermined time intervals at the same repetition rate as that of the exploratory pulses. This intermittent emission is accomplished by means of an interrupter which applies excitation voltage to the transponder for 0.067 second intervals separated by 0.133 second intervals. Due to lags inherent in the triggering circuits, the recognition pulses do not arrive at the detecting station exactly in phase with the echo pulses; they follow said echo pulses by a short time interval, say 3 to 5 microseconds. These recognition pulses may be transmitted at the same frequency as the exploratory pulses, or at a different frequency, usually the former. Whether at the same frequency or at a different frequency, they, like the echo pulses, are applied, after detection, to the intensity grid of the indicating oscilloscope.

The recognition pulses are wider than the exploratory pulses, and because of this, and the fact that the transmission of the recognition pulses is intermittent due to the above described interruption of the excitation voltage, whereas the rotation of the exploratory pulse antenna is continuous, there appears upon the screen of said oscilloscope a series of short radial lines extending outwardly from the echo indicating arcs of each craft equipped with a transponder, in other words, each interceptor.

Now, knowing the location of each interceptor, and knowing the location of each enemy plane, those on the ground can communicate with the fighter pilots, and guide them to their nearest opponents.

The situation and display described is the ideal; but, unfortunately, it has not, up to now, been attained. The radiation pattern of the exploratory pulse transmission is sufficiently discriminatory in azimuth to give accurate azimuth information because only a relatively narrow portion of the transmitted beam is of sufficient intensity to result in distinguishable echoes; but, the intensity of the radiation for many degrees on either side of this narrow portion is sufficient to trigger the airborne transponders, and, inasmuch as the energy transmitted by the transponder is independent of the amplitude of the triggering energy, the aforementioned radial lines, corresponding to the recognition pulses, are not confined to the limits of the echo indicating arcs of the planes causing the same. They appear upon the oscilloscope screen over wider arcs, sometimes as much as 180° in extent, thereby making it most difficult to associate a particular series of radial lines with a particular echo indicating arc. The confusion resulting is obvious, particularly, where two or more planes do not differ very much in their distances from the detecting station.

It is, therefore, the main object of the present invention to eliminate this failing, by either accentuating those radial lines which fall within the outer limits of the echo indicating arcs, or limiting the display of said radial lines to a sector entirely within the confines of said arcs.

It is a further object of the present invention to provide a very simple circuit for attaining the above mentioned object, which takes advantage of the fact that, as hereinbefore stated, a slight lag exists between the reception of the echo and recognition pulses due to a delay inherent in the transponder triggering circuits.

These, and other objects, which will become apparent as the detailed description progresses, are realized in the present invention in the following manner:

In the case where the recognition pulses are emitted by an air-borne transponder which both receives and transmits at the same frequency as that of the exploratory pulse transmission, the output of the ground receiver is, as has heretofore been the practice, applied to the control grid of the plan position indicating oscilloscope. The display of said oscilloscope therefore consists of echo indicating arcs, and recognition signal radial lines as well, and the latter extend considerably beyond the limits of the former. However, a portion of the output of said ground receiver is also applied to a circuit designed to compensate for the aforementioned inherent lag between the reception of the exploratory and recognition pulses, whereby said pulses are caused to produce superimposed pulses within a time interval equal to said inherent lag, a condition necessary to the operation of the gating circuit which follows. The output of the gating circuit, consisting of recognition pulses pedestaled upon echo pulses, is applied to the control grid of the oscilloscope, whereby those recognition signal radial lines which fall within the limits of the echo indicating arcs are reinforced so as to stand out by comparison with those outside of said limits. There is, therefore, no difficulty in associating any particular series of recognition signals with its proper echo indicating arc.

In the case where the airborne transponder receives at the frequency of the exploratory pulse transmission, but emits the recognition pulses at a different frequency, or both receives and emits at a frequency different from that of the exploratory pulse transmission, the output of the detection system receiver is, as usual, applied to the oscilloscope to obtain plan position indications of the craft within the range of the system. The recognition signals, however, are picked up on a separate antenna and detected by an auxiliary receiver, and then mixed with the output of the detection system receiver which, of course, consists only of the echo pulses. The mixed signals are then passed through time-compensating and gating circuits, and then applied to the oscilloscope. Inasmuch as with this arrangement there are no recognition pulses in the detection system receiver output and the gating circuit passes signals only when the proper time interval separates the echo and recognition pulses, the display of radial lines, corresponding to said recognition pulses, is confined to the limits of their proper echo indicating arcs.

In the accompanying specification there are described, and in the annexed drawings shown, several illustrative embodiments of the identification system of the present invention. It is, however, to be clearly understood that I do not wish to be limited to the details thereof herein shown for purposes of illustration only, inasmuch as changes therein may be made without the exercise of invention and within the spirit and scope of the claims hereto appended.

In said drawings, Figure 1 is a block diagram of a ground system for aircraft interception;

Figure 5 is a block diagram of another modification of the system shown in Figure 1.

Figure 1:
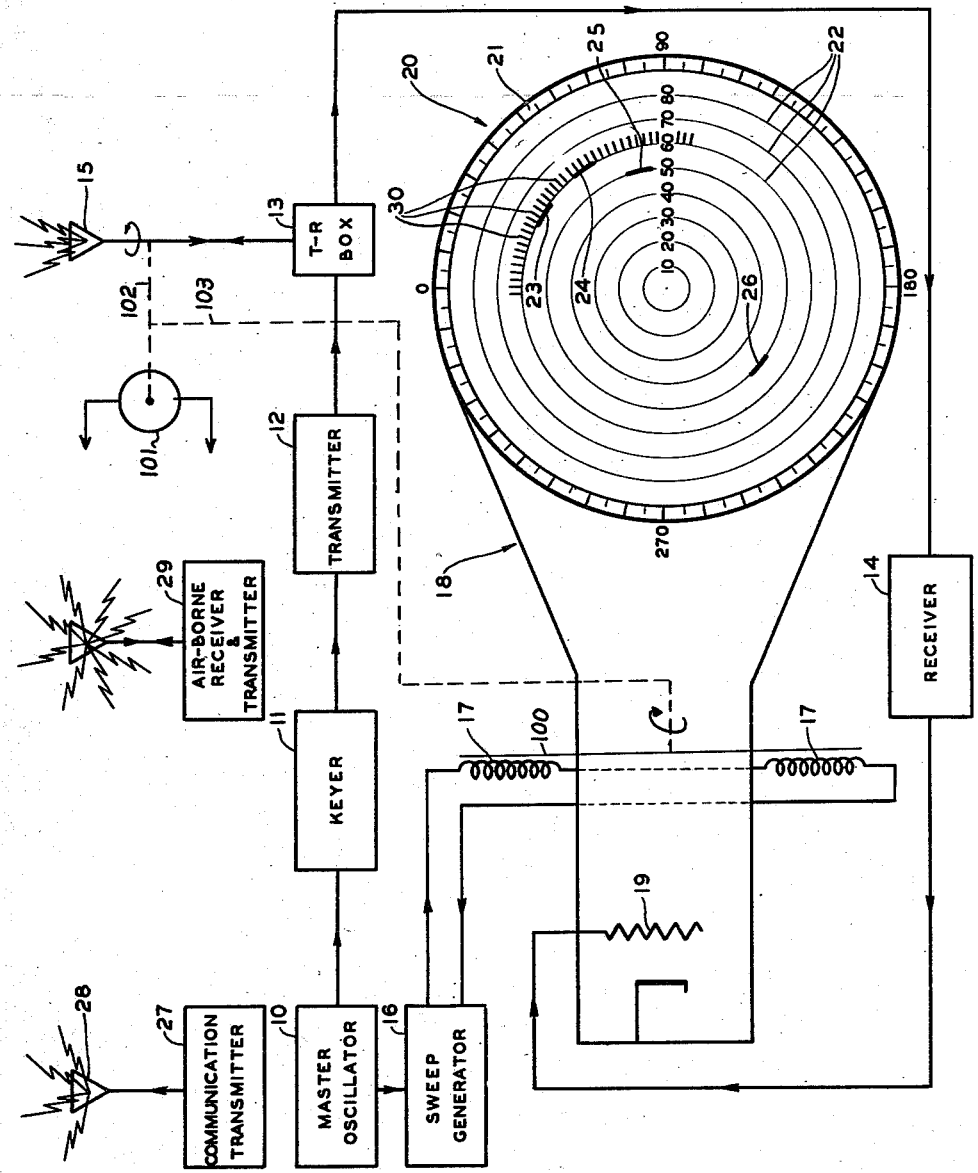

Referring now more in detail to the existing system for the ground control of interception of enemy aircraft, with particular reference to Figure 1 of the drawings, the numeral 10 designates a master oscillator having a sine-wave output of such an audio frequency that the period between cycles is sufficient to permit each transmitted pulse at least to travel to and return from a target at the maximum effective range of the system as a whole before the transmission of the next succeeding pulse. The sine-wave voltage thus developed is fed to a keyer 11 where it is transformed into sharp rectangular pulses, and the latter are applied to a normally quiescent transmitter 12 to periodically excite said transmitter and thereby generate audio frequency pulses of radio frequency energy. The output of the transmitter is fed, through a T-R box 13, designed to protect the system receiver 14 from undue shock during the periods when the transmitter is functioning, and suitable transmission lines, to a highly directional antenna array 15. T-R boxes are well known and, since they are not per se a part of my invention, need not be described in detail. One example of such device is described on pages 104–107 of the December 1945 issue of "Electronics." The antenna array 15 is rotatably mounted so as to enable the region surrounding the detecting station to be scanned with the pulses of radio frequency energy emanating therefrom. It is to be understood, however, that the antenna does not necessarily have to be scanning continuously; if desired, the radiation may be limited to a fixed sector.

The output of the oscillator 10 is also fed to a sweep generator 16 to obtain a saw-tooth current, which is applied to a pair of series connected deflecting coils 17 wound around a yoke, symbolically indicated at 100, which is rotatably mounted about the neck of a cathode-ray tube 18. The directional antenna 15 is continuously rotated by a motor 101, which also drives the yoke 100, as indicated by broken lines 102 and 103, whereby the rotation of the deflecting coils 17 is synchronized with the rotation of the antenna array 15. The sweep generator 16, coils 17, and tube 18 constitute components of a plan position-indicating oscilloscope, the electron beam of which is, by means of the arrangement described, deflected radially outward from the normal axis thereof in synchronism with the pulse transmission of the system, while the resulting radial sweep is rotated about said normal axis in synchronism with the scanning of the region surrounding the detecting station.

Upon encountering reflecting objects in space, such as aircraft, portions of the energy radiated by the antenna array 15 are reflected, and the resulting echo pulses are received by the antenna 15 and applied, through the T-R box 13, to the receiver 14. After detection in said receiver, said echo pulses are applied to the control grid 19 of the cathode-ray tube 18 to intensity modulate the electron beam thereof.

The cathode-ray tube 18 is provided with a sensitive screen 20, calibrated about the periphery thereof, as at 21, in terms of angular measurement, the original alignment of the deflecting coils 17 with respect to the initial direction of the radiation from the antenna array 15 being such that the radial sweep of the cathode-ray tube coincides with zero degrees on the scale 21 at the instant that the response pattern of the antenna array 15 is aligned with a reference direction, for example, north. The screen 20 is also provided with a plurality of concentric markings 22, calibrated, along some convenient radius, in terms of distance.

The electron beam of the cathode-ray tube is intensified by each echo signal received, and a bright spot therefore appears upon the screen 20 at a point corresponding to the azimuthal bearing and the range of the craft causing each particular signal. However, because of the polar pattern of the directional radiation of the antenna array 15, the echo signals from each craft appear upon the screen 20 as short arcs rather than distinct spots, the center of each arc corresponding to the azimuthal bearing of the craft causing the same, there being shown in the drawing four such echo-indicating arcs 23, 24, 25, and 26.

The arc 23 indicates the presence of a craft 30° to the east of the reference direction north, and about 57 or 58 miles distant from the station; the arc 24 indicates the presence of a craft 50° to the east of north, and about 60 miles distant; the arc 25 indicates the presence of a craft 75° to the east of north, and about 50 miles distant; and the arc 26 indicates a craft 220° from the reference direction, and about 50 miles distant. Thus, the observer has before him a display of the plan position in space of all craft, at that instant, within the range of the system.

The next step is to determine which of the detected craft are friendly and which are hostile. As stated in an earlier portion of this specification, an understanding of the means utilized to make this distinction is not necessary to an understanding of the present invention, and for this reason, such means are not herein further described. It is to be assumed, for the remainder of this explanation of the existing system for the ground control of interception, that those craft causing the echo indicating arcs 23 and 24 are friendly, and those causing the echo indicating arcs 25 and 26 are hostile.

It is next necessary for the observer to determine which of the two friendly craft, if either, is an interceptor. For this purpose, the observer, by means of a communication transmitter 27 feeding an ultra-high frequency antenna 28, broadcasts instructions to all fighter pilots within the range of the system to switch on transponders 29 with which their planes are equipped. This action upon the part of each fighter pilot enables his transponder to receive the exploratory pulses radiated by the antenna array 15 and become triggered thereby so as to omnidirectionally and intermittently emit, for preset time intervals, separated by intervals of inactivity as above outlined, recognition signals in the form of short pulses of radio frequency energy, somewhat wider than the exploratory pulses, having a repetition rate similar to that of the exploratory pulses. One example of such a transponder is disclosed in Army Air Forces Technical Publication No. CO–08–10BB–1, published Mar. 15, 1943, and bears the designation Radio Set SCR–695–A.

These recognition signals are picked up at the detecting station by the antenna array 15 and, after detection in the receiver 14, are applied to the control grid 19 of the cathode-ray tube 18. Due to delays which are inherent in the triggering circuits in the transponders 29, the recognition signals arrive back at the detecting station slightly behind the echo signals reflected from the planes emitting such recognition signals, and, for the reasons previously pointed out, such signals therefore appear upon the screen 20 as short radial lines 30 extending outwardly from the circumferences which includes the echo indicating arcs of the craft causing the same. However, as will be noted from the drawing, where more than one friendly craft is located at approximately the same distance from the detecting station, and within the azimuthal coverage of the exploratory pulse radiation, it is difficult to determine to which of the echo indicating arcs the radial lines belong. The reason for this is, as already indicated, that the pattern of the beam transmitted by the antenna array 15 is such that the intensity of the radiation beyond a couple of degrees on either side of the normal to the plane of the antenna array is insufficient to cause readable echoes, but it is sufficient to trigger the transponders. As a result, the radial lines 30 are not limited to sectors of the screen 20 within the confines of the echo indicating arcs, but instead extend over much greater arcs, sometimes as much as 180° in length.

I have discovered, however, as hereinbefore stated, that by either reinforcing those recognition signals which occur within the limits of the echo indicating arcs, or, confining the display of the recognition signals to the azimuthal width of the display of the echo indicating arcs, the confusion resulting from a picture such as that shown in Figure 1, can be avoided.

Figure 2:
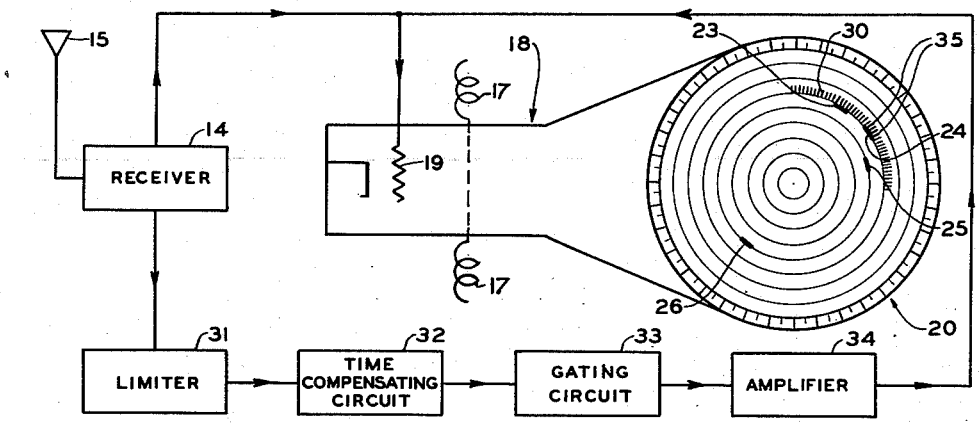
Figure 2 is a block diagram of a modification of said system in accordance with the present invention.

Referring now to Figure 2 of the drawings, it will be noted that the output of the receiver 14, consisting of echo and recognition pulses is, as before, applied to the intensity grid 19 of the cathode-ray tube 18. As in Fig. 1, the deflecting coils 17 are rotated in synchronism with antenna 15. In addition, a portion of the output of the receiver 14 is, after passing through a limiter 31 designed to assure a uniform amplitude for all of the received signals, echo and recognition, applied to a time-compensating circuit 32. This circuit is such as to compensate for the time intervening between the reception of the echo and recognition signals caused by the inherent delays in the triggering circuits of the airborne transponders 29, whereby said echo and recognition signals are caused to become mutually effective within a time interval equal to said inherent delay. The output of the time-compensating circuit is applied to a gating circuit 33, which remains inoperative unless the amplitude of the input thereto is equal to the combined amplitudes of the echo and recognition signals after the latter have passed through the limiter 31. Whenever, therefore, recognition signals are, in effect, pedestaled upon echo signals by the time-compensating circuit, the gating circuit 33 operates to provide a pulse output which, after passing through an amplifier 34, is applied to the control grid 19 of the cathode-ray tube 18. Thus, the radial lines corresponding to the recognition signals which fall within the confines of the echo indicating arcs are reinforced, so as to stand out by comparison with those radial lines appearing upon the oscilloscope screen beyond the limits of the echo indicating arcs. Such a series of radial lines is shown at 35. Examination of this display clearly indicates that the received recognition signals were emitted by the craft which caused the echo indicating arc 24, and so said craft is definitely identified as a friendly fighter.

With this information available, the oscilloscope observer can, by using the communication transmitter 27 (Figure 1), inform the pilot of said fighter of the location, with respect to his own location, of his nearest opponent, in the situation depicted in the drawings, the craft causing the echo indication 25. Instead of informing the pilot of said location, the oscilloscope observer can, through proper instructions, actually guide the pilot to his nearest opponent.

Figure 3:
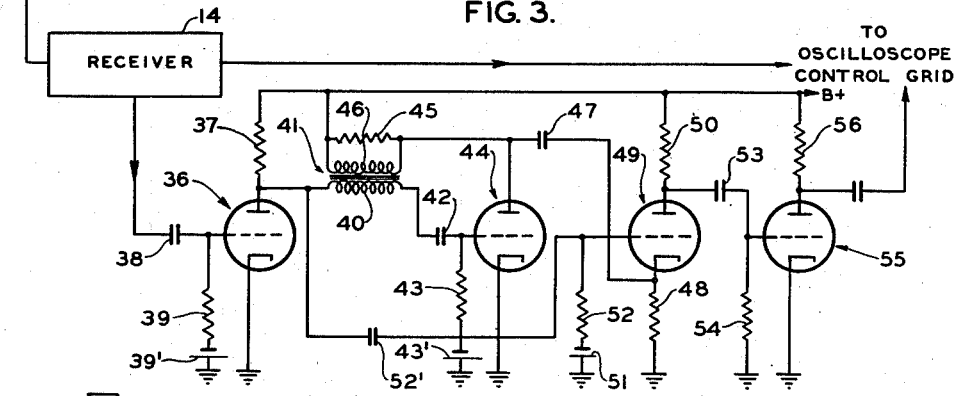
Figure 3 is a schematic diagram of one circuit which may be used for this purpose.

One form of circuit which may be used to attain this result is shown in Figure 3 of the drawings, wherein the limiter 31 consists of a vacuum tube 36 the cathode of which is grounded and plate voltage to which is supplied through a resistor 37. A portion of the output of the receiver 14, which output is preferably negative, is fed to the grid of said tube through a condenser 38, grid resistor 39, and bias battery 39'. The value of the bias should be such as to maintain the tube 36 normally conducting, but the tube is driven to cut-off by the negative output of the receiver whereby the output of tube 36 is limited. The positive output of said tube is applied, through the secondary winding 40 of a transformer 41, and a condenser 42, grid resistor 43, and bias battery 43', to the grid of a normally nonconducting vacuum tube 44, plate voltage to which is supplied through a resistor 45, and the cathode of which is grounded. The plate circuit of the tube 44 includes the primary 46 of the transformer 41 whereby positive feedback is obtained. The values of the condenser 42 and resistor 43 are such that the tube 44 operates as a blocking oscillator having a duty cycle equal in duration to the time delay between the reception of the echo and recognition signals. The negative output of the tube 44 is applied, through a blocking condenser 47, across a resistor 48 connected in the grounded cathode circuit of a vacuum tube 49, constituting the gating circuit 33. Plate voltage to the tube 49 is supplied through a resistor 50 and the tube is normally biased, by means of a battery 51 and resistor 52, series connected between ground and the grid, considerably beyond cutoff. A portion of the positive output of the tube 36 is also applied to the tube 49, through a condenser 52', this output being applied to the grid of said tube. The value of the bias on the tube 49 is such that unless the recognition pulses occur during the period of the duty cycle of the blocking oscillator 44, the tube 49 remains nonconducting. The negative output of the tube 49 is applied, through a blocking condenser 53 and grid resistor 54, to a vacuum tube 55 the cathode of which is grounded, and plate voltage to which is supplied through a resistor 56. The positive output of the tube 55, which constitutes the amplifier 34, is applied to the intensity grid of the oscilloscope.

Figure 4:
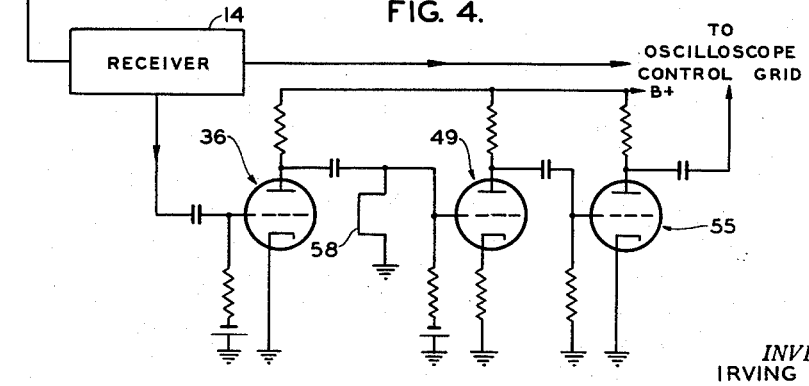
Figure 4 is a schematic diagram of another circuit which may be used for this purpose.

Instead of employing a blocking oscillator to bring about the mutual effectiveness of the echo and recognition pulses, I may use a delay line, which will cause actual coincidence. Such a line is shown in Figure 4, designated by the reference character 58. In this figure, the tubes 36, 49 and 55 are the equivalent of the similarly designated tubes in Figure 3. The manner in which the coincidence is brought about is as follows:

The line 58 is so designed that the time it takes for a pulse to go down the line and be reflected back is equal to the delay between the reception of the echo and recognition pulses. Thus, as each echo pulse first appears at the grid of the tube 49 it is insufficient to overcome the bais on said tube, but after going down the line it is reflected back and again reaches the grid of the tube 49, this time, simultaneously with the arrival of a recognition pulse. The now coincident pulses are of sufficient amplitude to render the tube 49 conducting.

I shall now describe the modifications necessary where the transponders receive at the frequency of the exploratory pulse transmission but radiate the recognition signals at a different frequency or receive and transmit at the same frequency, which is different than the frequency of the exploratory pulse transmission. For this purpose, reference is made to Figure 5 of the drawings.

As there shown, the echo pulses, after being picked up on the antenna array 15, and being detected in the receiver 14, are applied to the control grid 19 of the cathode-ray tube 18, thereby resulting in the echo-indicating arcs 23, 24, 25, and 26. In addition, the output of the receiver 14 is passed through a limiter 59, which may be similar to the like stage shown in Figures 3 and 4, after which it is applied to the time-compensating circuit 32. This circuit may take either the form shown in Figure 3 or that shown in Figure 4. The time-compensating circuit is followed, as before, by the gating circuit 33 and amplifier stage 34. Deflecting coils 17 are rotated in synchronism with antenna 15, as previously described in connection with Figs. 1 and 3.

In this system, there is also provided an antenna array 60 on which there is picked up the recognition signals emitted by the friendly fighters. Such signals are detected in an auxiliary receiver 61, limited in amplitude in a limiter 62 so as to match the output of the limiter 59, and then mixed with the echo signals in the time-compensating circuit 32.

With this arrangement, the recognition signals, which are transmitted at a different frequency than the exploratory pulses, and the echo pulses resulting from the latter, do not appear upon the oscilloscope screen except when they add with each other. The radial lines 63 resulting from these additions are therefore confined to the limits of the echo-indicating arcs.

The type of recognition signals herein illustrated result from the use of the transponder described in the above-cited publication. It is to be understood however that the present invention is not limited to use with such a transponder. Thus if a transponder which sends response pulses continuously were used, then the recognition signals would appear as solid arcs and not as radial lines as herein illustrated. The present invention is usable with any type of transponder which sends a response pulse a predetermined interval after the echo is reflected, which is inherent in practically all transponders.

This completes the description of the present invention, including the mode of operation thereof. It will be noted from all of the foregoing that I have provided a system whereby either a particular class of friendly aircraft may be identified apart from a whole field which includes hostile craft and other friendly craft, or friendly craft generally may be distinguished from enemy craft, thereby enabling more efficient ground control over the interception of enemy raiders than has heretofore been possible. It will also be noted that by means of the oscilloscope display circuits which I employ, confusion heretofore existing in associating the recognition signals with the craft emitting the same is eliminated; and it will further be noted that I attain this desirable result through the use of simple circuits employing standard parts.

Other advantages of the present invention will readily occur to those skilled in the art to which the same relates.

I claim:

1. In combination with an aircraft detection system including means for transmitting pulses of radio frequency energy into a selected region of space, means for detecting echo signals reflected by any aircraft encountered by said energy, and means for visually indicating the locations of said reflecting aircraft; an identification system comprising: means for transmitting recognition signals which lag the echo signals by a given time from such aircraft within said selected region as may be friendly, means for detecting said recognition signals, means for deriving delayed signals from said echo signals such that the delayed signals occur at the same time as the recognition signals, means for combining said delayed signals and recognition signals, and means for visually displaying concurrent echo and recognition signals.

2. In combination with an aircraft detection system including means for transmitting pulses of radio frequency energy into a selected region of space, means for detecting echo signals reflected by any aircraft encountered by said energy, and means for visually indicating the locations of said reflecting aircraft; an identification system comprising: means for transmitting recognition signals which lag the echo signals by a given time interval from such aircraft within said selected region as may be friendly, means for detecting said recognition signals, means for delaying each of the echo signals for substantially the said time interval, means for combining the delayed echo signals and the recognition signals, and means for visually displaying only those recognition signals which are coincident with said delayed echo signals in such a manner as to identify the locations of said friendly aircraft.

3. In combination with an aircraft detection system including means for transmitting radio frequency energy into a selected region of space, means for detecting echo signals reflected by any aircraft encountered by said energy, and means for visually indicating the locations of said reflecting aircraft; an identification system comprising: means for transmitting recognition signals which lag echo signals by a given time interval from such aircraft within said selected region as may be friendly, means for detecting said recognition signals, means for combining said last named echo signals with said recognition signals and delaying said echo signals in such manner as to compensate for said time lag and bring said combined signals into coincidence, and means for visually displaying said combined echo and recognition signals.

4. In combination with an aircraft detection system including means for transmitting pulses of radio frequency energy into a selected region of space, means for detecting echo signals reflected by any aircraft encountered by said energy, and means for visually indicating the locations of said reflecting aircraft; an identification system comprising: means for transmitting recognition signals which lag the echo signals by a given time interval from such aircraft within said selected region as may be friendly, means for detecting said recognition signals, means for combining said last named echo signals with said recognition signals in such manner as to compensate for said time lag and bring said combined signals into coincidence, said last named means including a blocking oscillator having a duty cycle equal in duration to said time lag and being receptive of said combined signals, and an electronic gate receptive of the output of said blocking oscillator and said combined signals and adapted to operate only if the amplitude of the input thereto exceeds that of said echo and recognition signals singly, and means for visually displaying said combined echo and recognition signals.

5. In combination with an aircraft detection system including means for transmitting pulses of radio frequency energy into a selected region of space, means for detecting echo signals reflected by any aircraft encountered by said energy, and means for visually indicating the locations of said reflecting aircraft; an identification system comprising: means for transmitting recognition signals which lag by a fixed interval the echo signals from such aircraft within said selected region as may be friendly, means for detecting said recognition signals, means for combining said last named echo signals with said recognition signals in such manner as to compensate for said time lag and bring said combined signals into coincidence, said last named means including a reflecting delay line having a time constant equal to said time lag and being receptive of said combined signals, and an electronic gate receptive of the output of said delay line and adapted to pass the input thereto only if the amplitude thereof exceeds that of said echo and recognition signals singly, and means for visually displaying said combined echo and recognition signals.

6. A system for distinguishing between friendly and hostile craft including means for transmitting pulses of radio frequency energy into a selected region of space, means for receiving echo signals from craft encountered by said energy, means for transmitting from friendly craft recognition signals that lag behind echo signals from said craft by a given time interval, means for receiving said recognition signals, means for combining the echo signals with their associated recognition signals in such a manner as to compensate for said time lag and make both of said last named signals concurrent, and means for visually displaying all of the echo signals and said concurrent signals.

7. A system for distinguishing between friendly and hostile craft including means for transmitting pulses of radio frequency energy into a selected region of space, means for receiving and displaying echo signals from all craft encountered by said energy, means for receiving in response to said energy from friendly craft in said selected region recognition signals which time-lag the echo signals received from said friendly craft, means for producing from said echo signals other signals which occur concurrently with the recognition signals, means for combining said other signals and recognition signals, and means for visually displaying the combined signals adjacent to their associated echo signal displays.

8. A system for distinguishing between friendly and hostile craft, including means for scanning a region of space with a highly directional beam of radio frequency pulses, means for receiving echoes from all craft encountered by said scanning energy, means for receiving recognition pulses which time-lag the echoes from such craft within the scanned region as may be friendly, means for combining the latter echoes with said recognition pulses in such manner as to compensate for said time lag and bring both of said last named signals into coincidence, means including a cathode ray tube for producing a cathode ray beam having a radial sweep synchronized with the transmission of said radio frequency pulses, means for rotating said sweep about the central starting point thereof in synchronism with said scanning, means for intensity modulating said beam with all said echo signals and coincident signals and visually displaying the variations in the intensity of said beam so produced.

IRVING STOKES.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,159,937 | Zworykin | May 23, 1939 |
| 2,212,110 | Beuermann | Aug. 20, 1940 |
| 2,403,600 | Holmes et al. | July 9, 1946 |
| 2,426,217 | Hoisington | Aug. 26, 1947 |
| 2,433,341 | Busignies | Dec. 30, 1947 |
| 2,455,265 | Norgaard | Nov. 30, 1948 |